PERMUTATION CODE SIGNALING

Filed June 26, 1962 5 Sheets-Sheet 1

INVENTOR
D. SLEPIAN
BY Harry C. Hart
ATTORNEY

INVENTOR
D. SLEPIAN
BY Harry C. Hart
ATTORNEY

INVENTOR
D. SLEPIAN
BY Harry C. Hart
ATTORNEY

INVENTOR
D. SLEPIAN
BY Harry C. Hart
ATTORNEY

INVENTOR
D. SLEPIAN
BY Harry C. Hart
ATTORNEY

United States Patent Office 3,196,351

Patented July 20, 1965

3,196,351

PERMUTATION CODE SIGNALING

David Slepian, Summit, N.J., assignor to Bell Telephone Laboratories, Incorporated, New York, N.Y., a corporation of New York Filed June 26, 1962, Ser. No. 205,831

8 Claims. (Cl. 325—41)

This invention relates to the transmission of information by permutation modulation, a novel coding technique employing code signals of limited bandwidth. Under many circumstances, permutation modulation yields a greater efficiency of communication than can be obtained conventionally.

There are two major aspects to the invention. One is logical; the other is instrumentational. The logical aspect will be presented first with emphasis on the operations to be performed and their advantageous consequences. This presentation is somewhat abstract and largely disregards the question of how the operations are to be performed.

Subsequently, with reference to the drawings, the instrumentational aspect of the invention will be presented. This presentation will set forth, both as to structure and as to mode of performance, the apparatus which carries out the requisite logical operations.

From a logical standpoint, permutation modulation entails a number of distinctive operations. First, a permutation encoding dictionary is used to associate information, presented for transmission, with a succession of specially selected symbolic code words. Each such word, which is one possible permutation of a prescribed sequence of numerals, is the basis for developing a band-limited signal that is transmitted to a receiver and used to derive a receiver sequence of numerals. Then, the receiver sequence is associated with one of the symbolic code words in the permutation encoding dictionary. Finally, successive symbolic code words are given the form of the information originally presented for transmission.

For ease in exposition, it will be assumed that, during a basic time interval, known as an encoding period, the information presented for transmission is an integer from 1 to M. It is assumed further that the integers are presented at a fixed rate. Digital information can be presented in this form by known coding techniques. Analogue information, such as that contained in a speech wave, can be converted to this form by sampling and quantizing the samples.

The first operation in permutation modulation relies upon a dictionary of symbolic code words, each of which is a sequence of $n$ real numbers, where the integer $n$ is the dimension of the dictionary. The number of such symbolic code words, i.e., the dictionary size, is made equal to M, the number of possible different integers presented for transmission during an encoding period. This is done either by choosing the dictionary or the encoding period appropriately, or by adjusting the source rate. The dictionary thus establishes a one-to-one correspondence between the M possible integers that can be presented for transmission during an encoding period and the M different sequences of real numbers that constitute the symbolic code words of the dictionary.

In one kind of dictionary, called Variant I, a prescribed sequence of $n$ real numbers, not necessarily all different, is taken for the first code word. The remaining code words of the dictionary consist of all distinct code words that can be formed by permuting the order of the $n$ numbers that form the first code word. In a second kind of dictionary, called Variant II, a prescribed sequence of $n$ non-negative real numbers, not necessarily all different, is taken for the first code word. The remaining code words of the dictionary consist of all distinct code words that can be formed by permuting the order and/or changing the signs of the $n$ numbers that form the first code word.

The particular manner of forming the encoding dictionary just described is a central feature of permutation modulation.

Once each coding period an integer is presented for transmission. Corresponding to the integer, a sequence of $n$ real numbers is provided by the encoding dictionary. These $n$ numbers are used to determine a band-limited code signal of approximate duration equal to the encoding period. In permutation modulation, the bandlimited code signal is derived by using the $n$ numbers as coefficients in a linear combination of $n$ prescribed elementary or basis signals. Although a great deal of choice is possible in the selection of the basis signals, they should be approximately bandlimited.

After being received, each band-limited code signal is observed for the time interval of one coding period. This signal is expressible as a linear combination of the $n$ basis signals being used, so that from it can be extracted a sequence of $n$ real number coefficients constituting a sequence of receiver numerals corresponding to the transmitted code word. The manner used to derive the receiver numerals from the received signal depends upon the choice of the basis signals. In any case, however, due to noise in transmission, the $n$ receiver numerals will not in general coincide exactly with any word of the encoding dictionary. Hence the permutation modulation receiver provides for replacing each sequence of receiver numerals with the most likely word from the encoding dictionary.

The sequence of receiver numerals is an ordered sequence of $n$ real numbers. The procedure for replacing this sequence by a word of the encoding dictionary depends on whether the encoding dictionary is of Variant I or Variant II.

Let the $n$ numbers that constitute any word of a Variant I dictionary be arranged in increasing numerical order in the algebraic sense, the smallest number first, then the next smallest, etc. Such an arrangement is called the standard sequence associated with the dictionary. Note that some adjacent terms in a standard sequence may have the same numerical value. When a Variant I dictionary is being used for transmission, a word of the encoding dictionary is constructed from a sequence of receiver numerals by first replacing the smallest number in this sequence by the first number in the standard sequence. Then the second smallest number in the receiver sequence is replaced by the second number in the standard sequence. This process is continued for $n$ steps until the largest number in the received sequence has been replaced by the last number of the standard sequence. A word of the encoding dictionary results.

Let the $n$ non-negative numbers that constitute the first word of a Variant II dictionary be arranged in increasing numerical order. Again, such an arrangement is called the standard sequence associated with the dictionary. When a Variant II dictionary is being used for transmission, a word of the encoding dictionary is constructed from a receiver sequence in a manner that is slightly different from that used in the Variant I case. First, the number in the receiver sequence having smallest absolute magnitude is replaced by the first number in the standard sequence, the latter number then being given the algebraic sign of the number in the receiver sequence that it replaces. Next, the number in the receiver sequence having second smallest absolute magnitude is replaced by the second number in the standard sequence, the latter number then being given the algebraic sign of the number in the receiver sequence that it replaces. This process is continued for $n$ steps until the number of largest absolute magnitude in the receiver sequence has been replaced by the last number of the standard sequence prefixed by the appropriate algebraic sign. A word of the encoding dictionary results.

The foregoing procedure for forming a word of the encoding dictionary from a receiver sequence is another feature of the invention.

Once derived from the receiver sequence, a word of the encoding dictionary is accepted as the symbolic code word originally presented for transmission. Using the encoding dictionary, this symbolic code word can be replaced by its corresponding integer from the list 1 to M.

Illustrative of the concepts presented are two simple examples of permutation modulation.

In the first example, let the standard sequence of a Variant I dictionary of dimension $n=5$ be −1, −1, 1, 1, 1. The dictionary is of size $M=10$ and can be displayed as in Table I.

*Table I*

| Message Number | Code Word |
|---|---|
| 1 | −1, −1, 1, 1, 1 |
| 2 | −1, 1, −1, 1, 1 |
| 3 | −1, 1, 1, −1, 1 |
| 4 | −1, 1, 1, 1, −1 |
| 5 | 1, −1, −1, 1, 1 |
| 6 | 1, −1, 1, −1, 1 |
| 7 | 1, −1, 1, 1, −1 |
| 8 | 1, 1, −1, −1, 1 |
| 9 | 1, 1, −1, 1, −1 |
| 10 | 1, 1, 1, −1, −1 |

If the five basis signals used with this dictionary are $\varphi_1(t)$, $\varphi_2(t)$, $\varphi_3(t)$, $\varphi_4(t)$, $\varphi_5(t)$, then when, for example, message number 5 is presented for transmission, the signal transmitted will be $$s_5(t)=\varphi_1(t)-\varphi_2(t)-\varphi_3(t)+\varphi_4(t)+\varphi_5(t)$$

The received signal $r(t)$ corresponding to the transmitted signal $s_5(t)$ will differ from it due to the interference of noise during transmission. The receiver processes the received signal $r(t)$ as a linear combination of the basis functions, $$r(t)=z_1\varphi_1(t)+z_2\varphi_2(t)+\ \ldots\ z_5\varphi_5(t)$$

and forms the receiver sequence by extracting the five $z$ coefficients in order.

For sake of illustration, suppose the $z$ coefficients have values $z_1=1.5$, $z_2=0.1$, $z_3=-1.3$, $z_4=.3$, $z_5=1.2$ so that the receiver sequence is 1.5, 0.1, −1.3, 0.3, 1.2. The standard sequence for the dictionary is −1, −1, 1, 1, 1. The receiver replaces the smallest number −1.3 in the receiver sequence by the first number −1 of the standard sequence. The second smallest number 0.1 of the receiver sequence is replaced by the second number −1 of the standard sequence. Continuing in this manner, 0.3 is replaced by 1, then 1.2 is replaced by 1, and finally 1.5 is replaced by 1. The constructed symbol sequence 1, −1, −1, 1, 1 is then identified from the coding dictionary as the code word corresponding to message number 5. In this case, the transmitted message has been correctly identified in spite of the interference caused by noise in transmission. In the second example, let the standard sequence of a Variant II dictionary of dimension $n=3$ be 0, 0, 1. The dictionary is of size $M=6$ and can be displayed as in Table 2.

*Table 2*

| Message Number | Code Word |
|---|---|
| 1 | 0, 0, 1 |
| 2 | 0, 0, −1 |
| 3 | 0, 1, 0 |
| 4 | 0, −1, 0 |
| 5 | 1, 0, 0 |
| 6 | −1, 0, 0 |

Denote by $\varphi_1(t)$, $\varphi_2(t)$, $\varphi_3(t)$ the basis signals employed with this dictionary. If message number 4 is presented for transmission, the signal $$0\varphi_1(t)-1\varphi_{2}At)+0\varphi_3(t)$$

will be generated. Let the corresponding received signal be resolved as $0.3\varphi_1(t)-1.5\varphi_2(t)-1.1\varphi_3(t)$, so that the receiver sequence is .3, −1.5, −1.1.

In the receiver sequence the number that is smallest in absolute value is 0.3. It is replaced by 0, the first number in the standard sequence 0, 0, 1 of the dictionary. Since 0.3 is positive, a plus sign is prefixed to the replacement zero. The number in the receiver sequence that is second smallest in absolute value is −1.1. This number is replaced by the second number 0 in the standard sequence and is prefixed by a minus sign. Finally, the number −1.5 of largest absolute value in the receiver sequence is replaced by 1, the last number of the standard sequence. This 1 is prefixed by a minus sign to agree with the sign of the number it replaces. The receiver has then constructed the sequence +0, −1, −0, or what is the same, 0, −1, 0. From the encoding dictionary this is identified as corresponding to message 4, and the receiver has correctly identified the message presented for transmission.

Other features of the invention and its instrumentational aspect will become apparent after the consideration of an illustrative embodiment taken in conjunction with the drawings in which.

Figure 1:
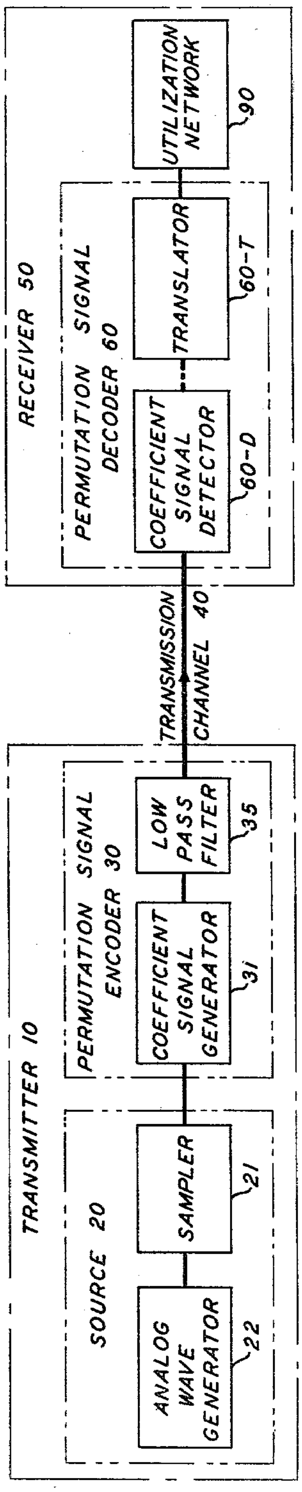
FIG. 1 is a block diagram of a permutation signaling system.

In broad outline the setting of the invention is given by FIG. 1. At a transmitter 10, information in the form of a message wave generated by a source 20 is converted into a succession of band-limited code signals by a permutation encoder 30. The code signals are conveyed by a transmission channel 40 to a receiver 50. There, despite disturbances on the channel, the message wave is reconstituted substantially without error through the use of a permutation decoder 60 and applied to a utilization network 90.

Although the encoder 30 at the transmitter 10 may take a variety of forms, the encoder shown in FIG. 1 produces permutation code signals by employing a coefficient signal generator 31 in conjunction with a low-pass filter 35. With such an encoder, a distinctive coefficient signal is identified with each numeral of a code word, and a group of the signals is associated with the entire word. In keeping with the permutation principle, the coefficient signals of each group are variously ordered, i.e., permuted, subject to the restriction that each group contain a prescribed number of subgroups, each with signals of like characteristic. Through the action of the filter 35, each group of coefficient signals becomes a desired code signal.

Of course, the encoder 30 is adapted to accommodate the output of the message source 20. When the output is obtained with a sampler 21 by sampling a continuous wave from an analog wave generator 22, it consists of a train of samples that represent the amplitudes of the message wave at successive instants. Then, the coefficient generator 31 can be of the type disclosed by R. L. Carbrey in Patent 2,602,158, as modified for permutation codes. Each sample applied to the generator 31 leads to a train of coefficient pulse signals that are equally spaced in time.

To clarify the operation of the coefficient generator 31, consider the example afforded by a simple permutation code designated $P_{(A,\ 2B)}$. Each word of the code consists of a group of three characters, e.g., numerals forming two subgroups, one with a single A character and the other with two B characters. Thus, one word from the code dictionary is ABB and, following the permutation principle, the other words of the dictionary are BAB and BBA, i.e., the dictionary is formed by taking all permutations of the characters in a master, but preselective code word, here ABB. Other permutation codes of greater complexity are considered subsequently.

Figure 2A:
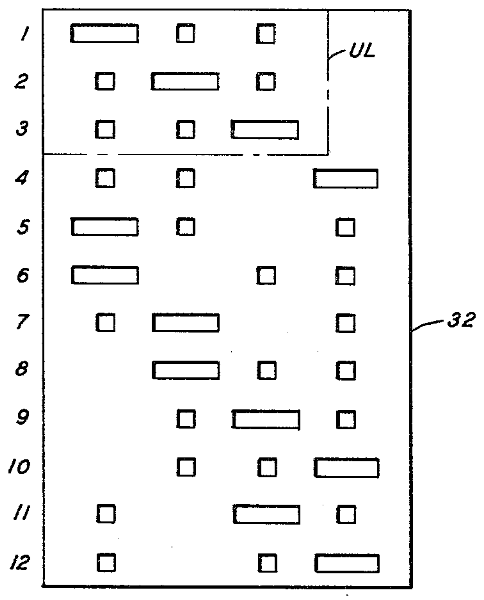
FIGS. 2A and 2B are pictorial representations of coding masks for the system of FIG. 1.

If the code letters A and B are associated with coefficient pulse signals having two units of amplitude and one-half unit of amplitude, respectively, then the coefficient signals can be generated by the upper left-hand section UL, shown in FIG. 2A, of a coefficient mask 32 for the coefficient generator 32 of FIG. 1. The first three ordinate positions, measured from the top of the mask, represent the three possible groups of coefficient signals identifiable with the dictionary. It is to be noted that following the Carbrey teaching the notches on the mask have widths determined by the relative amplitudes of the coefficient signals, i.e., each two-unit pulse signal corresponds to a notch on the coefficient mask having a width four times that for a half-unit signal. Moreover, it is usually desirable that each coefficient signal group have an average level of zero. This requires that the output of the coefficient generator 31 be augmented in known fashion by a bias level, here, a negative unit of amplitude.

Figure 3A:
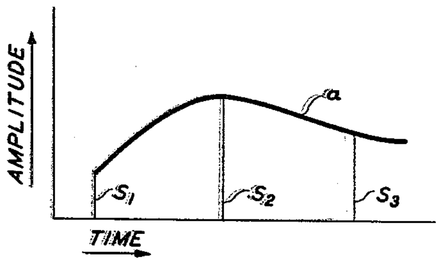
FIGS. 3A, 3B and 3C are a set of waveforms applicable to the system of FIG. 1.

A representative portion of the message wave from the source 20 of FIG. 1 is shown in FIG. 3A. Its envelope *a* is obtained from the wave generator and the samples $S_1$, $S_2$, and $S_3$, shown at succeeding equal interval positions along the time scale, are produced by the sampler 21 and applied at the input of the encoder 30. For illustration, the samples $S_1$, $S_2$, and $S_3$ have been taken as having magnitudes of one, three and two units, respectively, so that the entire dictionary of the permutation code $P_{(A,\ 2B)}$ is represented. These samples are converted by the coefficient generator 31 into the sequential groups of coefficient impulse signals $C_{1-1}$ through $C_{1-3}$ given in FIG. 3B. In keeping with the permutation code principle, each group contains two subgroups, one with two coefficient signals, $C_2$ and $C_3$ that are alike, and the other with but a single coefficient signal $C_1$ that is different from the other two.

Before being applied to the channel 40, each group of coefficient signals is converted into a code signal by passage through a low-pass filter 35. When the coefficient signals applied to the filter are of the impulse variety and are generated at uniform rate which is twice the bandwidth of the filter in cycles per second, each is transformed into a basis signal whose maximum amplitude is that of the coefficient signal and whose waveform function is $$\frac{\sin t}{t}$$

As a result, the code signal applied to the transmission channel 40 is the linear combination of the basis functions derived from the coefficient signals associated with a code word. Three successive code signals $K_1$, $K_2$, and $K_3$ are given in FIG. 3B. Each is band-limited. Where a bias level is added at the output of the coefficient generator 31, the direct-current component of the code signals is absent and the output of the filter is centered about an upwardly shifted amplitude axis.

Figure 3B:
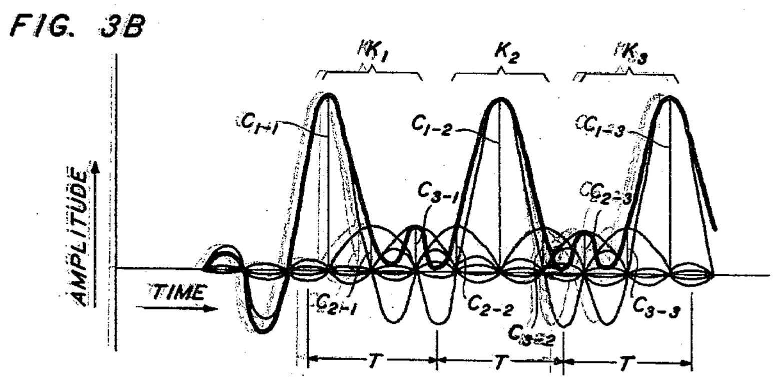
Figure 3C:
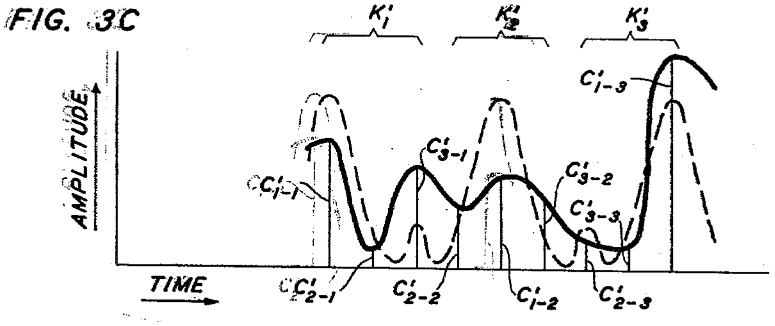

Because of disturbance on the channel, the code signals $K'_1$, $K'_2$, and $K'_3$ (FIG. 3C) arriving at the receiver differ from their transmitted counterparts $K_1$, $K_2$, and $K_3$ (FIG. 3B). Initially, the received code signals are converted by the permutation signal decoder 60 into a train of coefficient signals $C'_{1-1}$ through $C'_{1-3}$ similar, aside from disturbance effects, to those produced at the output of the coefficient generator 31. These receiver coefficient signals correspond to the receiver sequence of a code word.

If it were not for the disturbances, the receiver coefficient signals could be decoded directly by a translator 60–T of the decoder 60 into successive amplitude samples of the transmitted message wave. However, because of the disturbances, they are but provisionally representative of their transmitted counterparts and require "detection" by which the disturbance effects are removed.

In a detector 60–D of the decoder 60 the provisional coefficient signals are examined by group in order of amplitude. From the encoding format the number of subgroups of constant amplitude coefficient signals nominally forming a group is known beforehand and the provisional coefficient signals can be assigned correspondingly to their appropriate subgroups. This is done by starting at one end of the amplitude scale and proceeding in ascending or descending order to determine the provisional coefficient signals constituting a first subgroup. Then, like-amplitude replacement signals are assigned to the subgroup thus determined. This procedure is continued until all subgroups have been determined and assigned appropriate, like-amplitude replacement signals.

Figure 4A:
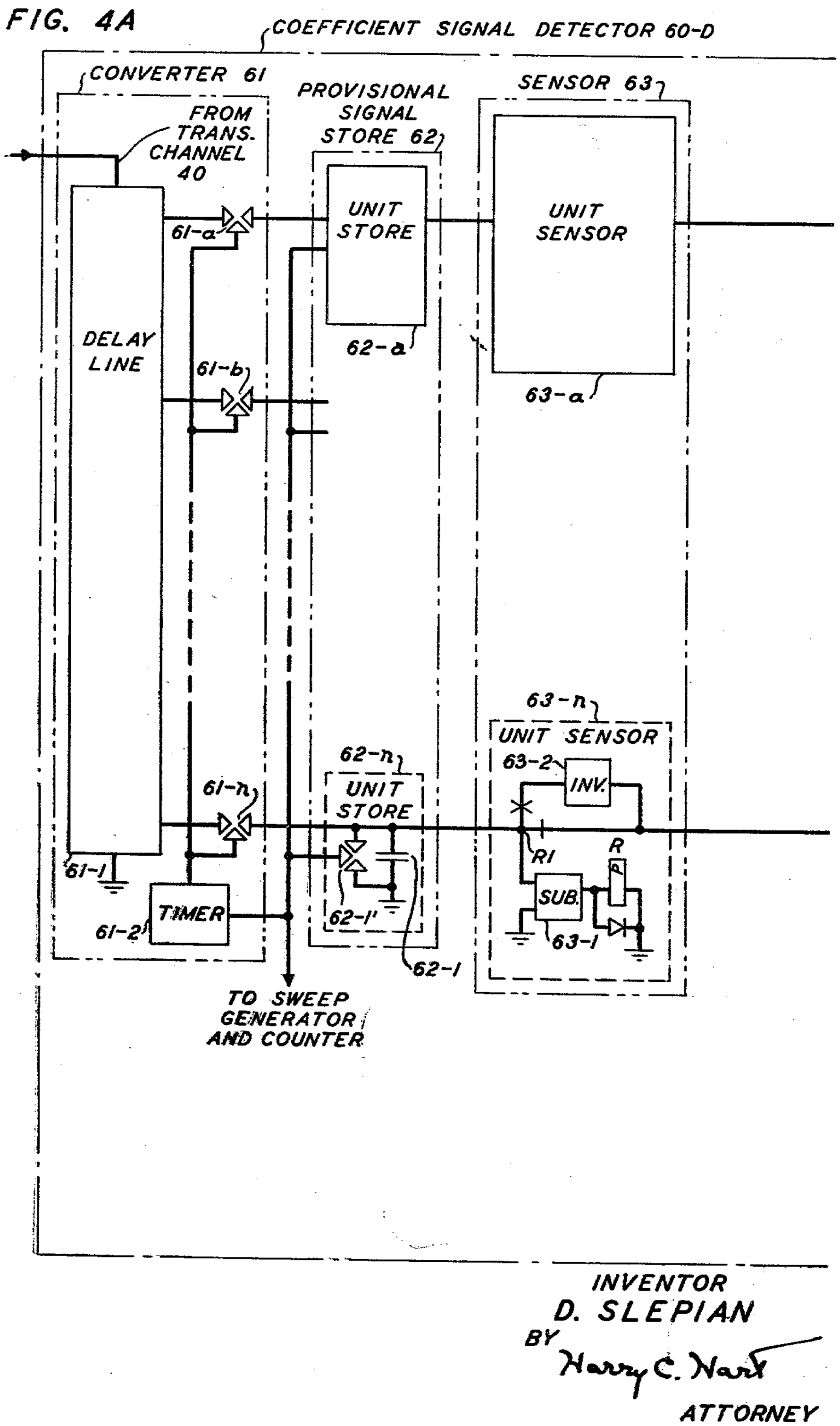
FIGS. 4A and 4B are schematic and block diagrams of a detector for the system of FIG. 1.
Figure 4B:
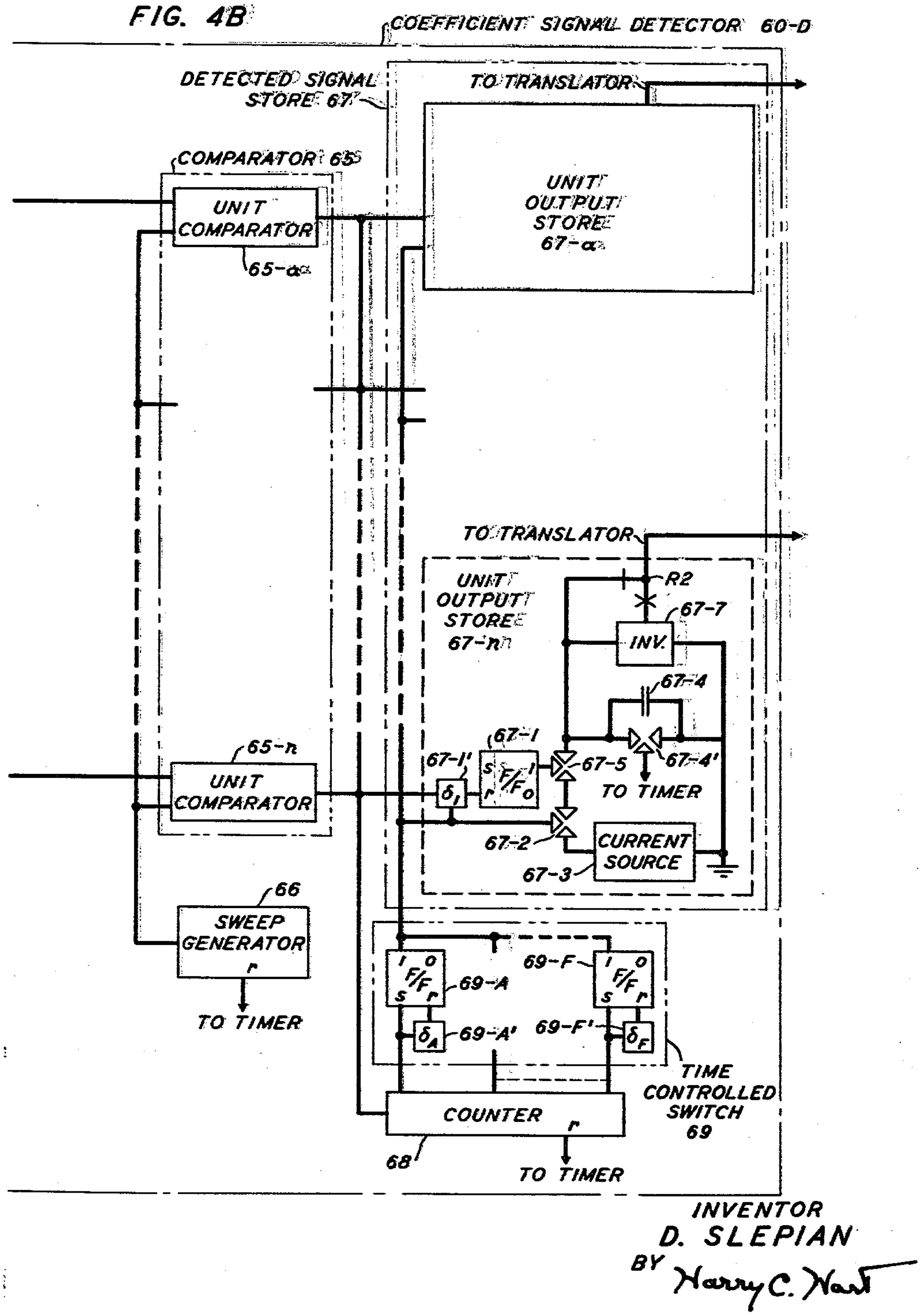

More specifically, as shown in FIGS. 4A and 4B for Variant I code, the coefficient signals are (a) extracted by group from the code signals by a converter 61; (b) entered into a provisional signal store 62; after which (c) a comparator 65 collates the amplitudes of the stored signals with those produced by a sweep generator 66. On the basis of the collation, the signals of various subgroups are identified and replacement signals are entered into an output store 67 for detected signals.

In the converter 61 the code signals traverse a delay line 61–1, which is terminated for no reflection. At the end of a coding period, a timer 61–2 momentarily closes normally open converter switches 61–*a* through 61–*n* and allows a group of the coefficient signals to simultaneously enter their associated unit stores 62–*a* through 62–*n*, each being, for example, a capacitor 62–1. To assure that the timer 61–2 operates at code period intervals the incoming wave can be accompanied by special framing signals, or self-framing can be employed.

For permutation modulations thus far considered the coefficient signals are of a Variant I code. However, the invention contemplates Variant II codes for which the detector 60–D must include a sensor 63. By their switching actions, to be discussed shortly, the unit sensors 63–*a* through 63–*n* provide positive signal levels to the comparator 65 whether the stored signals are positive or negative. In addition, the unit sensors 63–*a* through 63–*n* establish switching arrangements in the output store 67 to provide the output replacement signals with appropriate polarities. These sensory and switching arrangements are required only in the case of a Variant II code; for a Variant I code, they are desirably omitted from the receiver.

With either a Variant I or a Variant II code, the amplitudes of the stored coefficient signals are applied to unit comparators 65–*a* through 65–*n* (FIG. 4B), each of which can be the combination of a differentiator and a voltage crossing detector, and compared with those of a sweep generator 66 whose output ranges in sawtooth fashion from the most negative to the most positive anticipated level. For each concurrence of stored and sweep amplitudes, one of the unit comparators 65–*a* through 65–*n* advances a counter 68 and sets a flip-flop in its corresponding output unit store, for example the flip-flop 67–1 of the final unit store 67–*n*.

When the count registered by the counter 68 is the same as the number of coefficient signals in the first subgroup, a first flip-flop 69–A of a time controller 69 is energized. The time controller flip-flop 69–A closes normally open switches like switch 67–2 of the final unit store 67–n. As a result, current sources, like source 67–3, are allowed to charge these storage capacitors, like capacitor 67–4, associated with normally open control switches, like switch 67–5, which were closed earlier by the response of comparator flip-flops, like flip-flop 67–1, to the concurrences of stored and sweep amplitudes.

By virtue of a delay unit 69–A′, the first time controller flip-flop 69–A is reset after each enabled capacitor, like capacitor 67–4, has been charged to a coefficient signal level prescribed by the coding format for the first subgroup. In addition, for Variant II codes the unit sensors 63–a through 63–n (FIG. 4A) in a manner to be explained shortly, activate transfer contacts in the unit output stores, like contacts R2 in unit store 67–n, so that their outputs are of the same relative polarities as those of the provisional signals stored in the corresponding unit stores 62–a through 62–n of the provisional signal store 62 (FIG. 4A). The holding actions of the output store flip-flops, like flip-flop 67–1, are terminated by signals applied to their reset terminals through associated delay units, like delay unit 67–1′.

As a result of further responses of the comparator 65 to the sweep generator 66, the counter 68 continues to advance until the extent of a second subgroup is determined. Once again the time controller 69 operates, through a second time controller flip-flop (not shown), for a duration, controlled by a second delay unit (not shown), sufficient to allow storage of coefficient signals having the amplitude level of a second subgroup.

Still further responses of the comparator 65 take place until the sweep generator 66 has completed its excursion to the maximum level expected to be found in any subgroup of received coefficient signals. Then, after the final time controller flip-flop 69–F has operated for an interval determined by its associated delay unit 69–F′, the various output storage capacitors, like capacitor 67–4, contain appropriately detected coefficient signals associated with a code word.

To prepare for the detection of ensuing coefficient signals, the timer 61–2 (FIG. 4A) resets the counter 68 and sweep generator 66 and operates normally open switches, like 62–1′ and 67–4′, that discharge the storage capacitors, like 62–1 and 67–1.

Again considering the code wave of the simplified three-character permutation code $P_{(A, 2B)}$, the coefficient signals of the first group at the receiver, if unperturbed by channel disturbances, would have, as shown in FIG. 3B, relative amplitudes of 2, ½, ½. Because of the disturbances, the coefficient signals $C'_{1-1}$, $C'_{2-1}$, and $C'_{3-1}$ have relative amplitudes of 1½, ¼, 1¼, shown in FIG. 3C. However, it is known beforehand from the permutation code that each group of coefficient signals nominally has one subgroup with two constituents of one-half amplitude and another subgroup with a single constituent of double amplitude. Hence, the counter 68 is set to respond to counts of 2 and 3 and the corresponding controller flip-flops 69–A and 69–F are set for relative time duration of one and four. When the sweep generator 66 reaches a level of ¼, one of the unit comparators advances the counter by unity. Shortly afterward the sweep level becomes 1¼ and the counter 68 advances by one more unit. At this time the first controller flip-flop 66–A allows two of the output capacitors to charge to a ¼ unit level. Subsequently, the sweep reaches 1½ and a third output capacitor is charged to a 2 unit level, completing the detection.

After detection, the samples are applied to a translator 60–T which reconstitutes the transmitted message wave.

Of course, the three-character permutation code is merely illustrative. And, although the characters of the selected code have been translated into coefficient signal levels, it is evident that the translation could be in terms of frequency, pulse width, or any of numerous other characteristics.

In addition, if the code dictionary is insufficient to accommodate the message, it can be extended by increasing the number of character repetitions or by adding to the number of different characters. An example of the latter is given by expanding the permutation code $P_{(A, 2B)}$ to a three-character permutation code, designated $P_{(A, 2B, C)}$, constituted of three different characters, respectively, A, B and C. These characters can be associated with coefficient signals having levels of four, one and zero units. There result twelve possible groups of coefficient signals, which are generated by the entire coefficient mask 32 depicted in FIG. 2A. However, when the dictionary becomes very large and the code words very long, a coefficient mask becomes impractical. In that case, the message wave is transformed into digital signals which are bunched into data groups. Code signals are directly generated on the basis of a list of such data groups.

The Variant I permutation codes considered thus far have involved only permutations of the code characters.

Figure 2B:
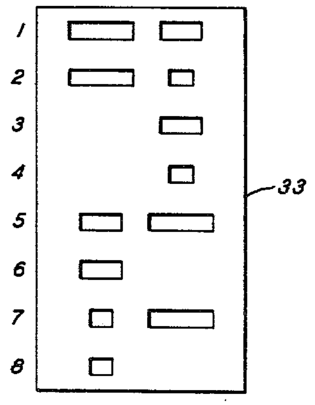

For a Variant II permutation code $P_{(\mp A, \pm B)}$, a master word AB gives rise to additional words A —B; —A B; and —A —B and the permutation of AB into BA gives rise to additional words B —A; —B A; and —B —A. Assuming the signal associations given earlier ($A=2$ units and $B=½$ units), the levels of the coefficient signals must range from —2 units to +2 units. This result can be obtained with the coefficient mask 33 of FIG. 2B, which is similar to that shown in FIG. 2A, covering the range from 0 to 4 units, by subtracting a level of two units from each code group at the output of the coefficient generator.

Where the coefficient signals are derived from a Variant II code, the unit sensors 63–a through 63–n of FIG. 4A are required. Each unit sensor contains a polarized relay R that responds only to negative-going signals obtained through a subtractor 63–1. The relay R operates two sets of transfer contacts R1 and R2, the first being in the unit sensor and the second being in an associated output unit store. Considering for the moment only the contact R1 in the unit store 63–n (FIG. 4A), if the signal in the unit store is positive, the relay R is unenergized and a direct signal path extends to a unit comparator 65–n. On the other hand, if the stored signal is negative, the direct path is opened and an alternate signal path is established containing an inverter 63–2. Hence, in either case the signal level at the unit comparator 65–n is positive. The operation of the transfer contacts R2 in the output unit store 67–n (FIG. 4B) is similar. If the signal in the input unit store (FIG. 4A) is negative, the output of the detector 60–D is taken by way of an inverter 67–7, restoring the coefficient signal polarity that was disregarded at the comparator 65.

While permutation modulation can result in correct transmission of information even in the presence of perturbations that alter the form of the transmitted signals, other existing signaling systems are also able to combat the effects of random disturbances introduced into a transmission system.

In order to compare the performances of different communication systems that transmit information using band-limited signals, at least six quantities descriptive of the systems and their environments must be taken into consideration. These are: the rate at which the system transmits information; the bandwidth occupied by the transmission signals; a measure of the power of these signals; a measure of the power of the ambient noise which perturbs the transmitted signals; the portion of the delay time between the introduction of the information at the input of the system and the emergence of useful information at the output that is due to the modulation employed; and a measure of the fidelity with which the information at the output of the system represents the information presented to the input of the system. While a meaningful comparison of two communication systems requires consideration of all six quantities, such a comparison will not, in general, yield a simple ordering of the two systems.

To understand the sense in which permutation modulation systems signal more efficiently than other systems, let the original information be digital and be transmitted at a rate measured in bits per second. Let the bandwidth be measured in cycles per second and the ambient noise be additive Gaussian with a uniform spectral density in the transmission band and let the measure of fidelity be the probability of error per bit of the output information. With probability of error, noise power and information rate prescribed, there are permutation modulation systems that operate with smaller values of bandwidth and average signal power than do conventional modulation systems. These parameters can be traded in many ways. For example, with average signal power, signal-to-noise ratio and bandwidth prescribed, there are permutation modulation systems that obtain a larger value of information rate than do other more conventional systems.

Specifically, consider the transmission of ten-digit (decimal) telephone numbers at a fixed rate with a maximum error rate of no more than one erroneous telephone number in ten thousand. For the same signal-to-noise power ratios as conventional pulse code modulation, an eleven-character permutation code $P_{(\pm 6A, \pm 5B)}$, with two subgroups of six and five like-coefficient signals, accomplishes the transmission with 80% of the bandwidth required by conventional pulse code modulation. If, as is commonly the case, the noise power in a frequency band is proportional to bandwidth, the permutation code $P_{(\pm 6A, \pm 5B)}$ is even more advantageous, requiring 80% as much bandwidth and 80% as much signal power as a PCM system. When the number of code digits is increased to twenty-five, in a permutation code $P_{(\pm 13A, \pm 12B)}$, the advantage over pulse code modulators is increased to the point where only 71% as much bandwidth and 76% as much power are needed.

In addition to achieving a high efficiency in the sense just described, permutation modulation has a number of other desirable properties.

(1) Each code word requires the same energy for transmission.

(2) The permutation modulation receiver operates on the receiver symbol sequence in an algebraic manner. It does not require that each of the M possible sent signals be locally stored at the receiver and compared with the received signal as must be done in certain other systems, such as those employing correlation detectors.

(3) The receiver continues to operate well even when small errors are made at the transmitter in fixing the magnitudes of the coefficients in the linear combination of basis functions.

(4) By proper choice of the encoding dictionary and basis functions, the transmitted waveforms in a permutation modulation system can be made to resemble random noise. This can be useful in safeguarding security of transmission as well as in jamming other communication on the same band of frequencies.

(5) When the perturbations in transmission are the result of additive Gaussian noise of uniform spectral density, and when the M messages presented for transmission are chosen independently with equal probability, the probability that a received signal be decoded in error is the same for each of the M messages. Furthermore, in this case, (6) The error probability achieved by the permutation modulation receiver is the minimum possible theoretically.

The foregoing presentation has dealt with specific illustrations of the concepts and operations involved in permutation modulation. A more general presentation, which follows, requires a knowledge of the view of the communication process presented by C. E. Shannon in "Communication in the Presence of Noise," Proceedings of the Institute of Radio Engineers, volume 37, pages 10–21, January 1949.

In any communication system employing signals limited in bandwidth to the frequency interval (O, W) cycles per second, the signal transmitted over the channel can be written in the form $$f(t)=\sum_{n=-\infty}^{\infty} a_j \Psi_j(t)$$

where $$a_j=f\left(\frac{j}{2W}\right)$$

and $$\Psi_j(t)=\frac{\sin 2\pi W\left(t-\frac{j}{2W}\right)}{2\pi W\left(t-\frac{j}{2W}\right)} \qquad (1)$$

The function of the transmitter can thus be regarded as establishing a mapping of the information presented for transmission into a suitably chosen sequenc of coefficients $a_j$. If every T seconds, where $2WT=n$, a positive integer, the information source presents one of M different messages for transmission, this mapping can be done in blocks of $n$ coefficients at a time. That is, the transmitter establishes a one-to-one correspondence between each of the possible M messages and M sequence of $n$ numbers each, such as shown in Table 3.

*Table 3*

| Message Number | Code Word |
|---|---|
| 1 | $x_{11}, x_{12}, \ldots, x_{1n}$ |
| 2 | $x_{21}, x_{22}, \ldots, x_{2n}$ |
| . | . |
| . | . |
| . | . |
| $i$ | $x_{i1}, x_{i2}, \ldots, x_{in}$ |
| . | . |
| . | . |
| M | $x_{F1}, x_{F2}, \ldots, x_{Mn}$ |

Whenever message number $i$ is presented for transmission, the next block of $n$ $a$'s have successively the values $x_{i1}, x_{i2}, \ldots, x_{in}$.

The correspondence listed in Table 3 is called the encoding dictionary and each sequence $x_{i1}, \ldots, x_{in}$ $i=1, 2, \ldots, M$ is called a code word. Each code word can also be regarded as a point in an $n$-dimensional Euclidean space, the $i$th code word corresponding to the point whose rectangular coordinates are $(x_{i1}, x_{i2}, \ldots, x_{in})$. A coding dictionary can then be thought of as specifying M particular points, called code points, in an $n$-dimensional space.

The basis functions (1) have the following properties:

(1)
$$\int_{-\infty}^{\infty} \Psi_i(t)\Psi_j(t)\,dt=\begin{cases} O, & i\neq j \\ \frac{1}{2W}, & i=j \end{cases} \qquad (2)$$

(2) Each $\psi_i$ is bandlimited to the frequency interval (O, W);

(3) From observation of a linear form $$r(t)=\sum_{j=1}^{n} x_j \Psi_j(t)$$

during the interval $$\frac{1}{2W}\leq t\leq \frac{n+1}{2W}$$

the coefficients $x_j$ can be recovered $$\left(x_j=r\left(\frac{j}{2W}\right)\right)$$

The signal associated with a code point having coordinates $(x_{i1}, x_{i2}, \ldots, x_{in})$ is $$r_i(t)=\sum_{j=1}^{n} x_{ij}\Psi_j(t) \quad (3)$$

The energy of this signal is $$E_i=\int_{-\infty}^{\infty} r_i^2(t)\,dt=\int_{-\infty}^{\infty}\left(\sum_{j=1}^{n} x_{ij}\Psi_j(t)\right)^2 dt=\frac{1}{2W}\sum_{j=1}^{n} x_{ij}^2$$

by (2), so that the squared distance of a code point from the origin is 2W times the energy of the corresponding signal transmitted over the communication channel.

If the disturbance on the channel is additive Gaussian noise with uniform power spectral density $N/W$ over the band (O, W) and zero elsewhere, then when $r_i(t)$ given by (3) is transmitted, the received signal $\bar{r}(t)$ will be $$\bar{r}(t)=\sum_{j=1}^{n} z_i\Psi_j(t)$$

where $$z_j=x_{ij}+y_j$$

and where the $y_j$ are independent Gaussian variates with mean zero and variance N. The coefficients $z_1, z_2, \ldots, z_n$ can be regarded as the coordinates of a point, the received message point, in the $n$-dimensional space containing the code points. Thus when the code point $(x_{i1}, \ldots, x_{in})$ is transmitted, the probability that the received message point will lie in a small region of volume $dz_1, dz_2 \ldots dz_n$ containing the point $(z_1, \ldots, z_n)$ is $$p(z_1, \ldots, z_n)\,dz_1 \ldots dz_n = (2\pi N)^{-n/2} e^{-\sum_{1}^{n}(z_j-x_{ij})^2/2N}\, dz_1 \ldots dz_n \quad (4)$$

The probability density $p(z_1, \ldots, z_n)$ depends only on the distance between the sent code point and the received message point, and is monotonic decreasing in this quantity.

Assume now that the M messages presented for transmission are each chosen with probability 1/M. The foregoing considerations then permit one to prove (see E. N. Gilbert, "A Comparison of Signaling Alphabets," Bell System Technical Journal, volume 31, pages 504–522, May 1952) that the average probability of error per decoded message will be minimized if each received message point is decoded as the nearest code point. A receiver that operates in this manner is called a maximum likelihood receiver.

In general, such a receiver must store or generate locally each of the M possible sent signals and compute the distance of the received message point from each of the code points choosing the closest of these for the decoded message. While such a receiver minimizes the average probability of error per decoded message, some messages may have a higher error probabilities than others. It will be shown next that in permutation modulation, maximum likelihood reception is accomplished without requiring the receiver to store or generate locally the possible sent messages and that each of the M possible sent messages has the same probability of being decoded incorrectly.

A Variant I permutation modulation encoding dictionary of dimension $n$ is determined by $k$ non-negative integers $m_1, m_2, \ldots, m_k$ satisfying $$m_1+m_2+\ldots+m_k=n$$

and by $k$ real numbers $\mu_1<U_2<\ldots<\mu_k$. The first code word of the dictionary is given in terms of the notation of Table 3 by the rule $$x_{1i}=\mu_j \text{ if } 1+\sum_{l=0}^{j-1} m_l \leq i \leq \sum_{l=0}^{j} m_l \quad (5)$$

$j=1, 2, \ldots k$, where $m_0$ is defined to be zero. Stated otherwise, the first code word consists of $\mu_1$ repeated $m_1$ times followed by $\mu_2$ repeated $m_2$ times, et cetera, followed by $\mu_k$ repeated $m_k$ times. The dictionary is formed from the first code word by making all permutations of the order of the terms of the first code word that lead to distinct sequences. The size of the dictionary is therefore $$M_I=\frac{n!}{m_1!m_2!\ldots m_k!}$$

A Variant II permutation modulation encoding dictionary of dimension $n$ is determined by $k$ non-negative integers, $m_1, m_2, \ldots, m_k$ satisfying $$m_1+m_2+\ldots+m_k=n$$

and by $k$ non-negative real numbers $$0=\mu_1<\mu_2<\ldots<\mu_k$$

The first code word of the dictionary is given by (5) with $m_0$ defined as zero. The remaining code words of the dictionary are obtained by first making all permutations of the order of the terms of the first code word that lead to distinct sequences, and then affixing plus or minus signs in all possible $2^{n-m_1}$ ways to the nonzero terms of each of these distinct sequences. The size of the dictionary is $$M_{II}=\frac{2^{n-m_1}n!}{m_1!m_2!\ldots m_k!}$$

In permutation modulation, the squared distance of the $i$th code point from the origin is $$d_i^2=\sum_{j=1}^{n} x_{ij}^2=\sum_{j=1}^{n} m_j\mu_j^2\equiv d^2$$

The distance $d_i$ is thus independent of $i$. All code points lie on a sphere with center at the origin. Stated otherwise, the transmitted messages corresponding to different code points all have the same energy $$\frac{1}{2W}d^2$$

Regarded as a set of points in $n$-dimensional Euclidean space, permutation modulation dictionaries possess certain useful symmetries which will now be described in detail. The $n!$ $nxn$-permutation matrices, when regarded as operators on vectors in Euclidean $n$-space, describe certain proper rotations which leave the distances between points invariant. From the manner of construction of a Variant I permutation modulation encoding dictionary, it is clear that every one of these $n!$ rotations sends every code point into a code point. Furthermore, there is a permutation matrix that will send any one specified code point into any other specified code point. In the case of Variant II dictionaries, the $2^n n!$ $nxn$-matrices having one nonzero entry in each row and column, that nonzero entry being $\pm 1$, play a role analogous to the permutation matrices. They leave distances invariant and send code points into code points. There are matrices in the collection that will send any one code point into any other other specified code point.

The preceding considerations permit one to show that when a maximum likelihood receiver is used with the code of a permutation modulation dictionary, all messages have the same probability of being decoded correctly. To obtain the conditional probability, $P_i$, that when code point $i$ is transmitted, it will be decoded correctly, one integrates the probability density (4) over the region $R_i$ defined as the set of points closer to the $i$th code point than to any other code point. From the preceding paragraph, it is clear that the distance preserving transformation that sends the $i$th code point into the $j$th code point (and also all code points into code points) also take $R_i$ into $R_j$. Since the integrand in the expression for $P_i$ depends only on the distance between points in the space, this same transformation on the variables of integration for the expression for $P_i$ will convert this integral into the expression for $P_j$. Thus $$P_1=P_2= \ldots P_M$$

The permutation modulation receiver for use with a Variant I code converts a receiver sequence $$z_1, z_2, \ldots z_n$$

into a code word of the dictionary by replacing the $m_1$ smallest $z$'s by the value $\mu_1$, the $m_2$ next smallest $z$'s by $\mu_2$, . . . et cetera, the $m_k$ largest $z$'s by $\mu_k$. To see that this procedure is the same as replacing the received message point by the nearest code point of the dictionary, consider the squared distance, $D_i^2$, between the received message point and the $i$th code point of the dictionary:

$$D_i^2=\sum_{j=1}^{n}(z_j-z_{ij})^2-\sum_{j=1}^{n}z_j^2+\sum_{j=1}^{n}z_{ij}^2-\sum_{j=1}^{n}z_jx_{ij}$$

The maximum likelihood receiver decodes the received message point as that code point which minimizes this expression. Since $\Sigma z_j^2$ is independent of $i$, and since $\Sigma x_{ij}^2=2WE$ independently of $i$ in a permutation modulation code, this is equivalent to finding the code point which maximizes $$\sum_{j=1}^{n}z_jx_{ij}$$

Since for a Variant I permutation modulation code, every word has $m_1$ $\mu_1$'s, $m_2$ $\mu_2$'s, et cetera, this is equivalent to finding the permutation of the numbers $x_1, x_2, \ldots, x_n$ which maximizes $$x_1z_1+x_2z_2+ \ldots +x_nz_n \quad (6)$$

when $m_1$ of the $x$'s have value $\mu_1$, $m_2$ of the $x$'s have value $\mu_2$, . . . et cetera, $m_k$ of the $x$'s have value $\mu_k$. Quite generally, the sum (6) is maximized by pairing the largest $x$ with the largest $z$, the second largest $x$ with the second largest $z$, et cetera. The truth of this statement is most easily shown by induction on $n$. It is trivially true for $n=1$. For arbitrary $n$, let $\bar{x}$ and $\bar{z}$ denote respectively the largest $x_i$ and the largest $z_i$. If $\bar{x}$ is not paired with $\bar{z}$ in the sum (6), then the sum contains the two terms $\bar{x}z'+x'\bar{z}$ with $x'\leqq\bar{x}$ and $z'\leqq\bar{z}$. If $\bar{x}$ and $x'$ are interchanged, the new sum (6) will not be less than the old sum since the difference between these sums is $$\bar{x}\,\bar{z}+x'z'-\bar{x}z'-x'\bar{z}=(\bar{x}-x')(\bar{z}-z')\geqq 0$$

The sum (6) then cannot be decreased by pairing the largest $x$ with the largest $z$. But then by the induction hypothesis, the remaining $n-1$ term of (5) will be maximized by pairing the remaining $n-1$ $x$'s with the remaining $n-1$ $z$'s in rank order. This completes the proof that for Variant I codes, the permutation modulation receiver is a maximum likelihood receiver.

The permutation modulation receiver for use with a Variant II code converts a receiver sequence $$z_1, z_2, \ldots, z_n$$

into a code word of the dictionary by replacing the $m_1$ $z$'s of smallest absolute magnitude by $\mu_1$ prefixed with the sign of the $z$ being replaced, by replacing the $m_2$ $z$'s next smallest in absolute magnitude by $\mu_2$ prefixed with the sign of the $z$ being replaced, et cetera. An obvious argument, similar to the one just given for Variant I codes, shows that this receiver is a maximum likelihood receiver.

The basis functions (1) can most readily be generated in a permutation modulation transmitter by applying appropriate impulses to an ideal low-pass filter with cutoff frequency W. The function $\Psi_j(t)$ results from applying a unit impulse to the filter at time $t=j/2w$. From a sum $$\bar{r}(t)=\sum_{1}^{n}z_j\Psi_j(t)$$

the coefficients $z_j$ can be extracted by measuring $\bar{r}$ at time $j/2w$. In fact, $z_j=\bar{r}(j/2w)$. In practice, then it is necessary for the receiver to maintain a timing source approximately synchronized with the transmitter.

In the geometric picture of a communication system discussed in the preceding paragraphs, only the distances between code points and the distance of these points from the origin entered the discussion. If the points of a code are rigidly rotated around the origin to a new position, a new code results. The error probability for the new code, when a maximum likelihood receiver is used, is the same as that for the original code. The signal power associated with the new code is the same as that for the old. Rotation of the code, however, is quite equivalent to rotating the coordinate axes. This latter operation, however, is the same as replacing the basis function $\Psi_i$ by new basis functions $\varphi_j$ through the relation $$\varphi_i(t)=\sum_{j=1}^{n}a_{ij}\Psi_j(t),\ i=1, 2, \ldots, n \quad (7)$$

where the $a_{ij}$ are elements of an $nxn$ orthogonal matrix. The functions $\varphi_i(t)$ obtained in this way are (1) all limited to the band (O, W) cycles per second, (2) all of equal energy (3) all approximately of duration T, (4) orthogonal to each other. If $n$ is large, any set of $n$ functions having these four properties can be expressed approximately in the form (7).

These remarks show that the many advantages of permutation modulation will still be retained if in forming the transmitted signals (3), the $\Psi_i(t)$ are replaced by any set of basis functions $\varphi_i(t)$ that are (1) approximately limited to the band (O, W) cycles per second, (2) all of approximately equal energy, (3) all approximately of duration T, (4) approximately orthogonal to each other.

When a general set of basis functions of the sort just described is used in a permutation modulation system, the signal transmitted when message $i$ is presented is $$r_i(t)=\sum_{j=1}^{n}x_{ij}\varphi_j(t)$$

where $x_{i1}, x_{i2}, \ldots, x_{in}$ is the symbolic code word of the permutation modulation dictionary corresponding to the $i$th message. The receiver sequence $z_1, z_2, \ldots, z_n$ for the time interval $0\leqq t\leqq$ is obtained from the received signal $\bar{r}(t)$ through the relations $$z_i=\int_0^T\bar{r}(t)\varphi_i(t)dt,\ i=1, 2, \ldots, n \quad (8)$$

In this case of general basis functions, then, the receiver may have to generate locally the $n$ basis functions. The number of such functions, $n$, is in general very much smaller than M, the dictionary size, so that a distinct advantage is still maintained over systems employing correlation detectors that require all M possible sent messages to be generated at the receiver. For special choices of the basis functions (such as the $\Psi_i$ of (1) for example), simpler means than (8) may be used.

In addition to the $\Psi_i$ of (1), another set of basis functions particularly attractive because of their ease of generation is $$\theta_1(t)\begin{cases}\frac{1}{\sqrt{2}}, 0\leq t\leq T\\ 0\end{cases}$$

otherwise $$\theta_j(t)=\begin{cases}\cos\ (2\pi j/T),\ 0\leq t\leq T\\ 0\end{cases}$$

otherwise $$\theta_{j+\frac{n-1}{2}}(t=\begin{cases}\sin(2\pi j/t), & 0\leq t\leq T\\ 0\end{cases}$$

$$j=1, 2, \ldots, \frac{n-1}{2}$$

Here $n=2WT$ is assumed odd. With these basis functions, the transmitted signals of a permutation modulation system are linear combinations of certain sinusoids of finite duration.

In the permutation systems described here, the signals generated for transmission have occupied the frequency band (O, W) cycles/second. The signals can, of course, be shifted in frequency to occupy a band of width W located in some other portion of the frequency spectrum by conventional techniques such as single siedband amplitude modulation. The received signals can be shifted down to the band (O, W) cycles/second before the receiver symbol sequence is extracted.

When the size, M, of a permutation modulation dictionary is large the problem of systematically instrumenting the correspondence between the integers 1, 2, . . ., M and the symbolic code words of the dictionary becomes of importance. Many ways of instrumenting this correspondence will suggest themselves to those skilled in the art of electronic computer design. For completeness, one numerical algorithm for effecting this correspondence will be presented now. The algorithm is given in the form of a computer program.

Let a Variant I dictionary be specified by the non-negative integers $m_1, m_2, \ldots, m_k$ and the real numbers $\mu_1<\mu_2<\ldots<\mu_k$ as described earlier. Let $$n=m_1+m_2+\ldots+m_k$$

and let $M=n!/(m_1!m_2!\ldots m_k!)$. Let $i, j, \alpha_1, \alpha_2, \ldots, \alpha_k$, N, $m$, $R_0, R_1, \ldots, R_k$ be integer variables. By following the steps (1) to (5) below in order, unless the instructions of a step dictate otherwise, an integer A, with $1\leq A\leq M$ will result in the generation of a unique code word $(x_{A1}, x_{A2}, \ldots, x_{An})$ of the dictionary.

(1) Set $i=1$, $R_0=A$, $N=n$, $m=M$, $\alpha_1=m_1$, $\alpha_2=m_2, \ldots, \alpha_k=m_k$.

(2) Set $j=0$.

(3) Set $$R_{j+1}=R_j-\frac{\alpha_{j+1}}{N}m$$

(4) If $R_{j+1}>0$, set $j=j+1$ and go to step (3).
If $R_{j+1}\leq 0$, set $x_{Ai}=\mu_{j+1}$, set $R_0=R_j$, set $$m=\frac{\alpha_{j+1}}{N}m$$

set $N=N-1$, set $\alpha_{j+1}=\alpha_{j+1}-1$, set $i=i+1$.

(5) If $N>0$, go to step (2).

(6) If $N\leq 0$, stop.

The decoding algorithm program inverse to the encoding just set forth uses the integer variables $i, j, \alpha_1, \alpha_2, \ldots, \alpha_k$, N, $m$, $R_0, R_1, \ldots, R_k, T_0, T_1, \ldots, T_n$. A symbolic code word $(x_{A1}, x_{A2}, \ldots, x_{An})$ is converted into an integer, A, by the program. When the process described by the program halts, $T_n=A$. The symbolic code word $(x_{A1}, x_{A2}, \ldots, x_{An})$ is first converted to a normal form by replacing $\mu_i$ by $i$, $i=1, 2, \ldots, k$. Denote the resultant sequence by $(\xi_1, \xi_2, \ldots, \xi_n)$. The program follows:

(1) Set $T_0=1$, $i=1$, $\alpha_1=m_1$, $\alpha_2=m_2, \ldots, \alpha_k=m_k$, $N=n$, $m=M$.

(2) Set $j=1$, $R_0=0$.

(3) If $\xi_i>j$, set $$R_j=R_{j-1}+\frac{\alpha_j}{N}m$$

$j=j+1$ and go to step (3).

If $\xi_i\leq j$, set $T_i=R_{j-1}+T_{i-1}$, set $$m=\frac{\alpha_j}{N}m$$

$\alpha_j=\alpha_j-1$, $N=N-1$, $i=i+1$.

(4) If $N\leq 0$, stop.
If $N>0$, go to step (2).

Similar arithmetic algorithms can be devised for encoding and decoding from the integers into words of a Variant II dictionary and back to the integers.

When the information originally presented for transmission is in analogue form and $n$ is relatively small, the process of sampling and quantizing these signals and encoding them into the words of a permutation modulation dictionary can be carried out in a single step by using techniques familiar in pulse code modulation. This has been demonstarted in the example of instrumentation given earlier. The reconstruction of the analogue signal at the receiver can be achieved by applying impulses of magnitude proportional to the original samples of the information to a low-pass filter. If $n$ is not too large, combinational circuits can be used to generate these impulses from the code words obtained at the receiver by decoding the receiver sequences. If $n$ is very large, it may be preferable to instrument by digital techniques a decoding algorithm of the sort given above that maps the code words into integers. The original encoding should be effected so that these integers are simply related to the sample values. Elementary logic circuits can then be used to map the integers into appropriate impulses.

What is claimed is:

1. Apparatus for removing perturbations from a subgroup of nominally like-amplitude signals included in a group of perturbed multi-amplitude signals, which comprises
means for sweeping through the amplitude range of the perturbed signals,
means for generating a control signal for each amplitude coincidence of said sweeping means with a perturbed signal,
counting means caused to advance by one count for each incidence of said control signal,
and means responsive to the attainment of a count equal to the number of signals in said subgroup for assigning thereto their nominal signal level.

2. Correction apparatus which comprises means for deriving, from an incoming wave, a train of coefficient signals having provisional amplitude levels,
means for selecting a plurality of said signals constituting a first subgroup,
means for assigning a first arbitrary signal level to said first subgroup,
means for selecting only those of said signals constituting a second subgroup,
and means for assigning a second arbitrary signal level to said second subgroup,
thereby to correct the provisional signal levels of the first and second subgroups.

3. Apparatus for processing received code signals having provisional amplitude levels that may depart from nominal because of disturbances, which comprises
means for extracting provisional coefficient signals from the received signals,
means for identifying said coefficient signals in order of their provisional amplitude levels,
and means responsive to selected pluralities of the identified coefficient signals, for assigning selected amplitude levels thereto,
thereby to remove any disturbances therefrom.

4. Apparatus for demodulating incoming code signals generated through the use of a permutation code dictionary based upon a standard and ordered sequence of $n$ real numbers, which comprises
means for extracting from each code signal, a sequence of receiver signals associated with a receiver sequence of $n$ real numbers, means for replacing the receiver signal associated with the smallest number in the receiver sequence by a replacement signal associated with the first number in the standard sequence, and means for replacing the receiver signal associated with the second smallest number in the receiver sequence by a replacement signal associated with the second number in the standard sequence.

5. Apparatus for demodulating incoming code signals generated through the use of a permutation code dictionary based upon a standard and ordered sequence of $n$ real numbers, which comprises means for extracting, from each code signal, a sequence of receiver signals associated with a receiver sequence of $n$ real numbers, and means for replacing the receiver signals by replacement signals progressively resulting in the substitution of each number in said receiver sequence by only one number in the standard sequence starting with the substitution of the smallest number in the receiver sequence by the first number of the standard sequence and terminating with the substitution of the largest number in the receiver sequence by the last number in the standard sequence.

6. Apparatus for substantially removing the effects of disturbances from incoming code signals, which comprises means for extracting, from each code signal, receiver signals associated with a receiver sequence of $n$ real numbers, means for replacing the receiver signal associated with the smallest absolute magnitude number in the receiver sequence by a replacement signal associated with the first number in a standard and ordered sequence of $n$ real numbers, means for polarizing the first replacement signal according to the algebraic sign of the number associated with the first receiver signal, means for replacing the receiver signal associated with the second smallest absolute magnitude number in said receiver sequence by a replacement signal associated with the second number in said standard sequence, and means for polarizing the second replacement signal according to the alegbraic sign of the number associated with the second signal.

7. Apparatus for demodulating incoming code signals generated through the use of a permutation code dictionary based upon a standard and ordered sequence of $n$ real numbers, which comprises means for extracting, from each code signal, a sequence of receiver signals associated with a receiver sequence of $n$ real numbers, means for replacing the receiver signals by replacement signals progressively resulting in the substitution of each number in said receiver sequence by only one number in the standard sequence starting with the substitution of the smallest absolute magnitude number in the receiver sequence by the first number in the standard sequence and terminating with the substitution of the largest absolute magnitude number in the receiver sequence by the last number in the standard sequence, and means for polarizing the replacement signals according to the algebraic signs of the numbers in said receiver sequence.

8. In combination with apparatus for deriving, from a message-wave code group constituted of distinctive amplitude subgroups, a train of code signals with provisional amplitude levels that may depart from their nominal levels because of disturbances, code correction apparatus which comprises means for monitoring the derived signals, means for identifying monitored signals of a plural group in order of their provisional amplitude levels, means responsive to a number of the identified signals constituting a subgroup in accordance with a preassigned code, and means for consistently assigning selected amplitude levels to the signals of said subgroup, thereby to remove any disturbances therefrom.

References Cited by the Examiner

UNITED STATES PATENTS

| | | | |
|---|---|---|---|
| 2,592,308 | 4/52 | Meacham | 178—79 XR |
| 2,832,827 | 4/58 | Metzger | 178—68 |
| 3,030,614 | 4/62 | Lehan et al. | 340—204 |
| 3,087,011 | 4/63 | Boothroyd et al. | 178—5.2 |

DAVID G. REDINBAUGH, *Primary Examiner.*